United States Patent [19]

Hewitt

[11] Patent Number: 4,611,617

[45] Date of Patent: Sep. 16, 1986

[54] IRRIGATION VALVE CONTROL APPARATUS

[76] Inventor: Ronnie D. Hewitt, Rte. 1, Box 48, Oakley, Id. 83346

[21] Appl. No.: 737,332

[22] Filed: May 23, 1985

[51] Int. Cl.⁴ .................. F16K 17/40; F16K 31/05
[52] U.S. Cl. ..................... 137/68.1; 251/129.04; 251/129.12; 251/248
[58] Field of Search ............... 137/68 R, 68.1; 251/129.04, 129.09, 129.12, 129.13, 248, 249.5, 129.11

[56] References Cited

U.S. PATENT DOCUMENTS

| | | | |
|---|---|---|---|
| 2,302,695 | 11/1942 | Kalix | 251/248 |
| 3,011,509 | 12/1961 | Wilson | 251/129.12 |
| 3,066,758 | 12/1962 | Turner | 137/68 R |
| 3,113,473 | 12/1963 | Morlen | 251/248 |
| 3,334,859 | 8/1967 | Raymond, Jr. | 251/129.12 |
| 3,615,056 | 10/1971 | Weiss | 251/129.04 |

FOREIGN PATENT DOCUMENTS 586972 11/1959 Canada ................. 251/129.09
010416 4/1980 European Pat. Off. ....... 251/129.09

OTHER PUBLICATIONS

Raymond Control Systems, "Valve Actuators and Controls".

Primary Examiner—George L. Walton
Attorney, Agent, or Firm—Workman, Nydegger & Jensen

[57] ABSTRACT

An apparatus mountable on an irrigation pipe or other type of pipeline for use in controlling valves disposed within those pipes. The apparatus includes a mounting bracket which is attachable to the valve mechanism and the irrigation pipe. The mounting bracket includes mounting plates for various components of a drive mechanism which includes an electric motor, a gear box, a main gear and a drive chain which places the gear box in communication with the main gear. The main gear is attached to the valve mechanism such that by operating the motor, the valve may be turned on or off.

16 Claims, 9 Drawing Figures

IRRIGATION VALVE CONTROL APPARATUS

BACKGROUND

1. The Field of the Invention

The present invention is generally directed to agricultural irrigation systems, and more particularly, it is directed to novel apparatus for controlling irrigation valves.

2. The Prior Art

Since it became a desirable and generally accepted practice to transport various liquid and gaseous materials by pipeline, methods have been required for controlling the flow of those products within the pipeline system. Pipelines of various types are, of course, widely used in a variety of fields. For example, energy pipelines of various types are found in every region of the country and carry such products as natural gas, oil and natural gas liquids from their point of production to the point of end use. In addition, in attempts to increase the amount of farmable land surface, water has become another product which is commonly carried by a pipeline.

In arid and semi-arid environments, such as those existing generally in the western United States, production of various crops depends upon the ability to transport water to those crops. Rain fall in these areas is relatively sparse, commonly not exceeding approximately 10 inches per year. As a result, in order to grow most agricultural crops it is clear that water must be transported to the farm from a remote location.

Since the colonization of the western United States in the late 19th century, it has been a common practice to use irrigation as a method of supporting agricultural production. Irrigation systems began as a simple series of canals and ditches which were capable of taking water from springs or streams and transporting it to the field. Since that time irrigation systems have become much more sophisticated.

Many irrigation systems are currently comprised of complex systems of pipes which are able to carry water from a central source to the field. For example, a typical irrigation system may include a large main water line of up to 12 inches in diameter. Such main lines may easily carry 1,000 gallons of water per minute or more. These main lines are then fed into various smaller branch lines until finally the water reaches a small distributor line, possibly accompanied by a sprinkler at the terminal end. These smaller lines may typically carry approximately 150 gallons of water per minute.

It will be appreciated that it is critical to control the flow of water through the system. The farmer must have efficient equipment and methods to direct needed water to particular areas of his farm and to stop the water flow to areas which have sufficient irrigation water.

It is not uncommon for a farm, particularly in the western United States, to be comprised of several hundred or even several thousand acres. As a result, it will be appreciated that the task of irrigating such a farm is substantial. As a result, various valve systems have been developed which help to mechanize the task of irrigating crops by controlling the flow of water through the irrigation system.

It is now common practice to use electrically controlled valves on the various water pipelines used in irrigation systems. This allows a farmer to irrigate his crops automatically through an electrical system which controls the various valves. The farmer is provided with the ability to remotely, and even automatically, direct a predetermined quantity of water to a predetermined location on his farm.

While such systems have many advantages, when valves are operated remotely by an electrical control means, it is clear that the farmer is not able to check the condition of each valve as it is operated. Thus, dirt and other contaminants may enter the valve and associated motor without detection. The motor and valve may thus be operated while the contaminants are in contact with the mechanism. As a result, the potential for damage to the valves and associated motor assemblies is great.

It is the current practice in most conventional irrigation systems to employ a valve which is controlled by a small electric motor. The motor is connected to the main electrical control system so that the valve can be opened and closed remotely. The typical motor which is now in wide use is a ⅛th horsepower electric motor. The gears associated with the motor are generally made of a type of plastic such as nylon or teflon. Unfortunately, the motors used in the prior art are not currently equipped with adequate safety shut-off control mechanism. As a result, if dirt or other types of obstructions enter the gears or the associated valve, the small motor will continue to turn until either the motor is damaged or the gears are rendered unusable.

A significant problem with such motor and valve assemblies is that they do not employ conventional replaceable parts. Thus, when a gear or motor is damaged, it is not practical to attempt to replace the damaged part; as a result, the entire motor and assembly must be removed and replaced with a new motor and assembly. It will be appreciated, therefore, that the use of such a motor and assembly rapidly becomes very expensive.

It is apparent that what is currently needed in the art is a more durable and reliable valve control mechanism than those which have been available in the past. It would be an advancement in the art to provide a valve control mechanism which could remotely control a valve, yet had safety features built in which would protect the valve and control mechanism from damage. It would be a further advancement in the art to provide such a valve control mechanism which employed conventional and inexpensive parts which could be easily replaced if necessary.

It would also be an advancement in the art if such a valve control mechanism had a conventional manual method of turning the valve on and off. And, mentioned above, it would be a significant advancement in the art to provide a valve shut-off mechanism which included a safety feature which would prevent damage to the mechanism in the event any part of the mechanism became jammed or clogged. Such an apparatus is disclosed and claimed herein.

BRIEF SUMMARY AND OBJECTS OF THE INVENTION

The present invention is directed to novel apparatus for controlling irrigation valves in the field. Specifically, the current invention is directed to a motor and gear assembly which can easily turn on and off even the largest of conventional agricultural irrigation valves. The current invention not only employs heavy duty parts throughout to minimize failure, but it also is designed such that individual parts which may fail are readily repairable without the need to replace the entire control assembly. It will be appreciated that the larger and more durable parts (for example, the use of a one horsepower electrical motor and metal instead of plastic parts) are more acceptable for agricultural on-site usage.

The present invention can be attached to a conventional butterfly valve mounted in a large mainline irrigation pipe. The present invention includes a mounting bracket which provides for mounting of the various component parts. Attached to the top of the butterfly valve is a large gear, which is driven by a heavy duty chain which engages the various teeth on the gear. The chain in turn is in mechanical communication with a gear box which is driven by a motor.

The axis of rotation of the motor output is generally horizontal. The motor output is connected to the gear box which translates the rotation to a vertical rotation which in turn is capable of turning the gear, and finally the valve which is securely mounted to the gear, thereby controlling the flow of water through the pipe.

The motor, gear box, gear, and chain employed in the present invention are conventional and easily obtainable. Thus, if there is a problem with one of the parts or if a part is damaged in operation, it is a simple matter to remove that part and replace it with a readily available replacement part. While the initial purchase cost of the current invention is comparable to that of prior art devices, the fact that the various parts are replaceable at a nominal price makes the device economically attractive over the long run.

In addition, the current invention utilizes a safety shear pin which minimizes the possibility of damage to any of the more sensitive parts of the apparatus. Once the safety shear pin is broken, the device will be automatically shut off so that the device will not be damaged further.

It is, therefore, an object of the current invention to provide a durable and reliable agricultural irrigation valve control assembly.

It is a further object of the present invention to provide an irrigation valve control mechanism which employs available and readily replaceable parts.

Another object of the present invention is to provide an irrigation valve control mechanism which includes a safety shut off system.

It is still a further object of the present invention to provide an irrigation valve control mechanism which has a convenient means of manual operation in case of mechanical or power failure.

These and other objects of the invention will become apparent in view of the following detailed description and appended claims and upon reference to the accompanying drawings.

DETAILED DESCRIPTION OF THE PREFERRED EMBODIMENTS

The mechanism for controlling an agricultural irrigation valve of the present invention can be best understood with reference to the accompanying drawings, wherein like parts are designated with like numerals throughout. It will be appreciated from the discussion below that this invention is extremely durable and efficient, uses conventionally available parts so that replacement of parts is a simple task and has safety features which protect the device from damage.

Figure 1:
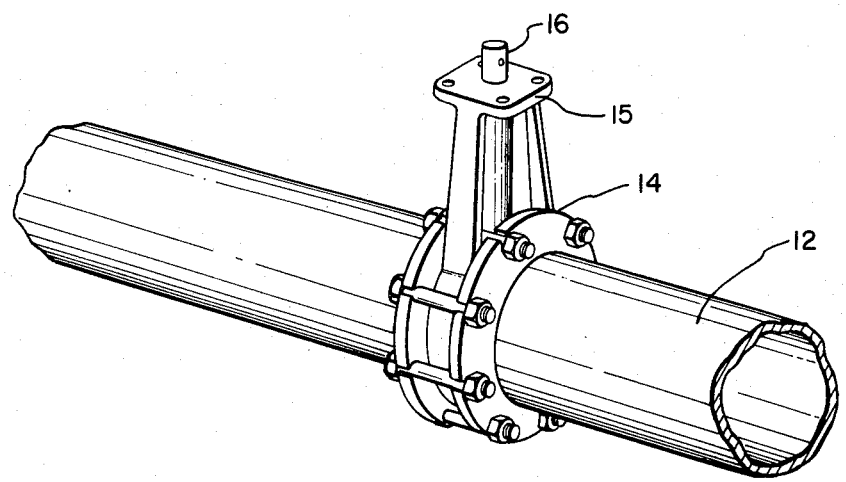
FIG. 1 is a side elevational view of a conventional butterfly valve mounted in a pipe.

While the current invention is capable of use in connection with valves on various types of pipelines, it is anticipated in particular that it will find wide acceptance for use in controlling valves on pipes carrying irrigation water. Such a pipe and valve are illustrated in FIG. 1. In FIG. 1, a relatively large diameter irrigation pipe is illustrated and designated 12.

Mounted between the two segments of pipe 12 is a conventional butterfly valve assembly 14. Valves (such as valve 14) are well known and conventional in the art. The portion of valve 14 which is disposed within pipe 12 is a generally disk-shaped plate (not shown) having an outside diameter essentially equal to the inside diameter of pipe 12. Thus, when the plate is turned to a position where it is parallel to a cross-section of pipe 12, flow through pipe 12 is impeded and eventually stopped. When the plate is turned 90 degrees, however, with the plate being aligned with the longitudinal axis of the pipe, flow down the pipe continues essentially unobstructed.

Valve 14, illustrated in FIG. 1, is of the type described above. The rod 16 which extends upwardly from the top of the valve is in communication with the plate (not shown) disposed within the pipe 12. By turning rod 16, the plate will be rotated and flow within pipe 12 can be stopped or started as desired.

Figure 2:
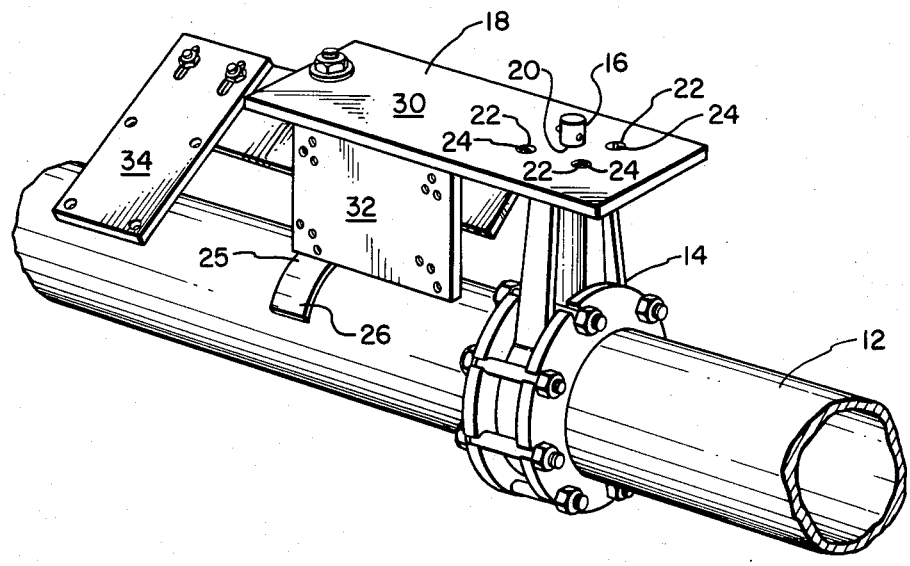
FIG. 2 is a perspective view of the main assembly mounting bracket of one embodiment within the scope of the present invention in place on a pipe.

In order to secure the control mechanism of the current invention, generally designated 10, to valve 14 and pipe 12, a mounting bracket 18 is provided. As illustrated in FIG. 2, mounting bracket 18 is provided with an opening 20 which is wide enough to receive rod 16 which extends upwardly from valve 14. Mounting bracket 18 is also provided with a plurality of holes 22 which correspond to a plurality of holes in mounting plate 15 of valve 14. Thus, bolts 24 may be passed through holes 22 in mounting bracket 18 and through the holes in mounting plate 15 and secured with nuts and washers as necessary.

Figure 3:
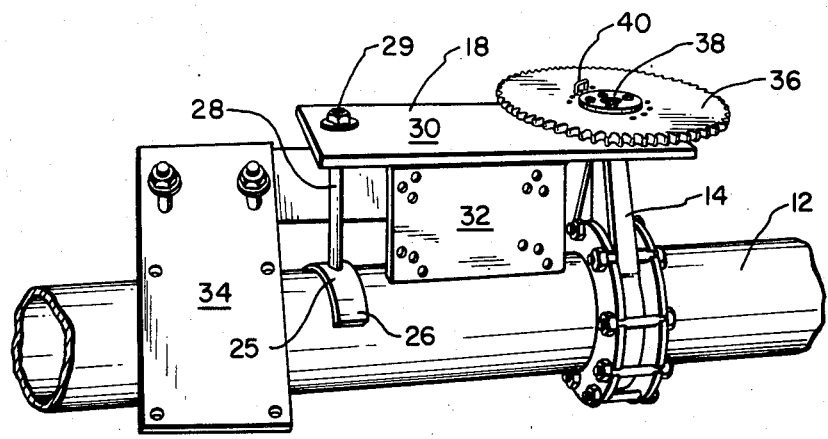
FIG. 3 is a perspective view of the mounting bracket together with the gear mounted on the valve assembly.

As illustrated in FIG. 3, the opposite end of mounting bracket 18 is supported on pipe 12 by a support brace 26. The support brace has a curved bottom portion 25 which corresponds to the curvature of pipe 12. Attached to curved bottom portion 25 of support brace 26 is a length of small conduit 28 which extends upwardly from curved portion 25 of support brace 26. The conduit 28 is configured so that it can pass through and be attached to a portion of mounting bracket 18 using a nut 29, or any other conventional connecting means.

Mounting bracket 18 is provided with mounting plates for receiving the various other components of the control mechanism 10. The mounting plates illustrated in FIG. 2 include gear mounting plate 30 over which the main gear travels, a gear box mounting plate 32 which is configured so as to be capable of receiving a gear box for attachment, and a motor mounting plate 34. These mounting plates are placed so that the other components may all be mounted to the appropriate mounting plate and be secured in position to operate appropriately.

In FIG. 3, main gear 36 is shown mounted in place upon rod 16 of valve 14. The main gear may be mounted to rod 16 in any conventional manner, however, as illustrated in this embodiment of the device the gear is attached using a main gear anchor washer 38 and a plurality of bolts. Also illustrated in FIG. 3 is the sheer pin 40 which, as will be more fully described below, provides a measure of safety for control mechanism 10.

Figure 4:
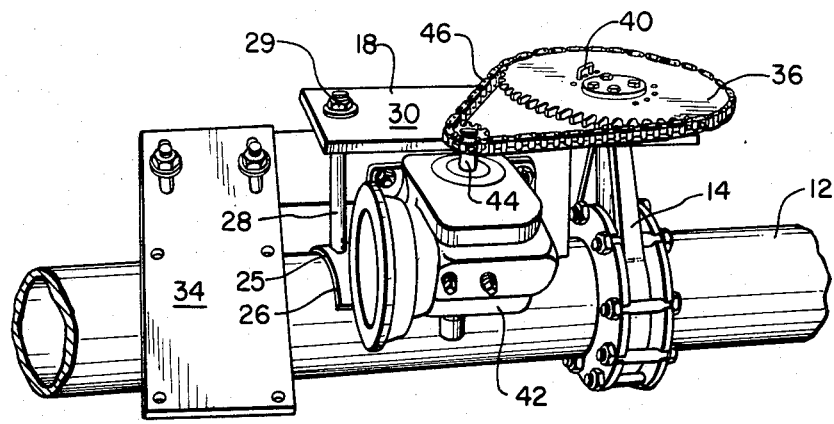
FIG. 4 is a side elevational view of the mounting bracket together with a gear, chain, and gear box secured in place.

Referring now to FIG. 4, additional components of the control mechanism 10 are illustrated. Specifically, gear box 42 is shown mounted on gear box mounting plate 32. It will be appreciated that drive shaft 44 extends upwardly out of gear box 42. Drive shaft 44 has a plurality of teeth which are suitable to engage main drive chain 46.

As further illutrated in FIG. 4, main drive chain 46 is chosen so that it can easily engage the teeth of the main gear 36 and the end of drive shaft 44. Thus, when drive shaft 44 rotates the chain will cause main gear 36 to rotate accordingly.

Figure 5:
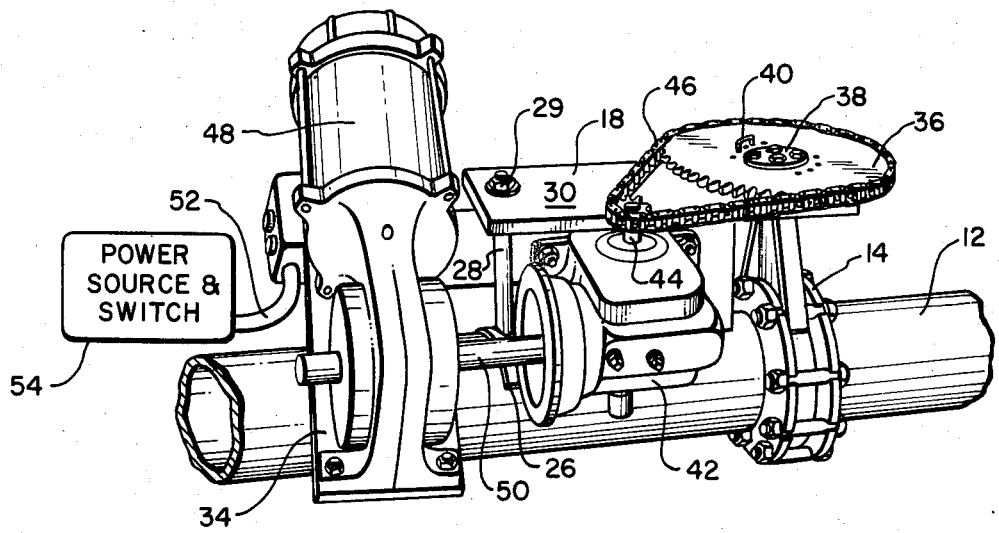
FIG. 5 is a side elevational view of the present invention including a motor secured in place.

Referring now to FIG. 5, motor 48 is shown mounted on motor mounting plate 34. The main motor drive shaft 50 exits motor 48 and is secured to gear box 42. As a result, as the motor drive shaft 50 rotates, the rotation is transmitted through gear box 50 to cause the drive shaft 44 to rotate which in turn causes the chain and the main gear 36 to rotate. Thus, as motor 48 turns causing motor drive shaft 50 to turn, the rotational force will be transmitted eventually to rod 16 of valve 14 which will, in turn, either open or close valve 14.

As can be appreciated with reference to drawings 1 through 5, all of the components of control mechanism 10 are conventional, heavy duty and easily replaceable. For example, motor 48, as illustrated in the current embodiment of the device, preferably has a power rating of approximately 1 horsepower. This is in contrast to the prior art devices which currently use motors having a power output of approximately ⅛th horsepower.

In addition, it will be appreciated that both main gear 36 and main drive chain 46 are relatively large and are made of heavy duty materials such as steel. Corresponding parts of prior art devices are typically made of plastic such as nylon or teflon. The same is true with respect to gear box 42. Gear box 42 is a heavy duty gear box capable of converting the rotational energy of motor 48 to rotational energy of drive shaft 44 at approximately a 50:1 ratio.

Figure 6:
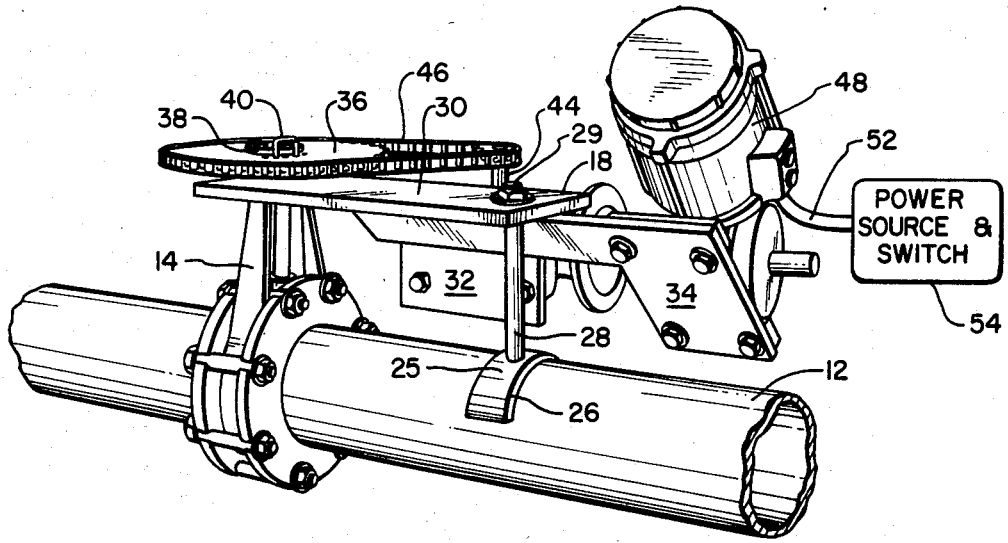
FIG. 6 is a perspective view of the present invention illustrating the invention from the reverse side from that illustrated in FIG. 5.

As will be appreciated with reference to FIGS. 5 and 6, the current invention is configured so that each of the various working components of the control mechanism 10 is easily accessible and easily replaceable. For example, in the event main drive chain 46 became damaged or broken it would be a relatively simple task to place a new drive chain on main gear 36 and to connect that chain to gear box 42.

Similarly, it would be a relatively simple task to replace the other parts of control mechanism 10. Motor 48 and gear box 42, for example, could be easily removed from mounting bracket 18 by simply removing the various bolts which secure those components in place. Likewise, main gear 36 could easily be removed by simply removing the bolts which secure main gear anchor washer 38 in place. All of the component parts are readily accessible and readily removable so that replacement of damaged parts is facilitated.

It is currently anticipated that motor 48 will be placed into communication with the main control system of the irrigation system as a whole. Thus, an electrical power cable 52 will be connected to motor 48. When it is desired to open or close valve 14 is it only necessary for power to be transmitted to motor 48 from a power source 54 through electrical cable 52 as shown diagrammatically in FIGS. 5 and 6. This may easily be done by a switch, also shown in FIGS. 5 and 6, at a location remote from the control mechanism 10.

One of the primary problems encountered by prior art devices was the inability to shut off the control mechanism if problems developed at the valve site. Since the control mechanism may be operated from a remote location, as can the current device, it was easy for the motor, the gears in connection with the motor, or the valve itself to become damaged in the event a problem arose at the valve site. Such problems are not uncommon and typically arise when dirt or other objects clog the various parts of control mechanism 10.

Figure 7:
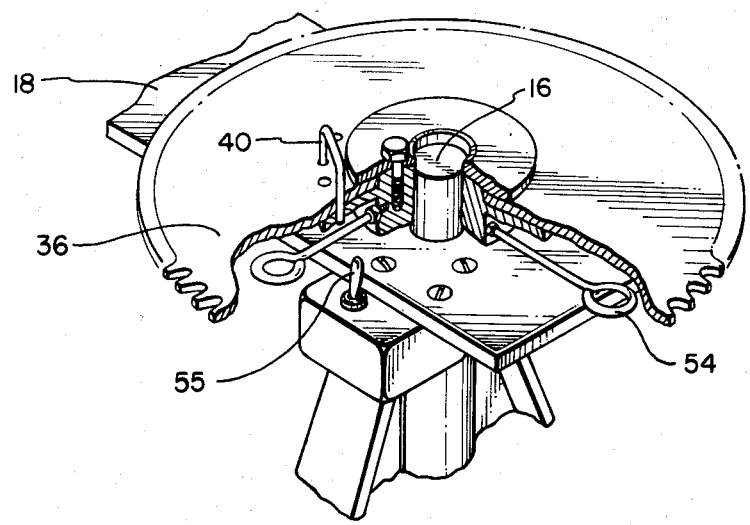
FIG. 7 is a partially broken away perspective view of the sheer pin and automatic shut off assembly of the present invention.

The embodiment of the present invention illustrated in FIGS. 1 through 6 employs a sheer pin 40 which will cause the device to shut off in the event undue stress is encountered by gear 36 which in turn causes sheer pin 40 to be sheered off. In the embodiment of the invention illustrated best in FIG. 7, sheer pin 40 is positioned such that it protrudes through main gear 36. In its simplest form, sheer pin 40 may be a wire loop which extends into main gear 36. The sheer pin will extend through main gear 36 into the automatic shut off mechanism 54. Sheer pin 40 provides the mode of communication main gear 36 and the auto shut off mechanism 54. Thus, it will be appreciated that if the lower extremities of sheer pin 40 are sheered away that auto shut off mechanism 54 will travel a distance sufficient to contact the shut off switch 55 and turn the device off. This prevents the device from continuing to operate once forces are encountered which are sufficient to cause sheer pin 40 to sheer away.

Figure 8:
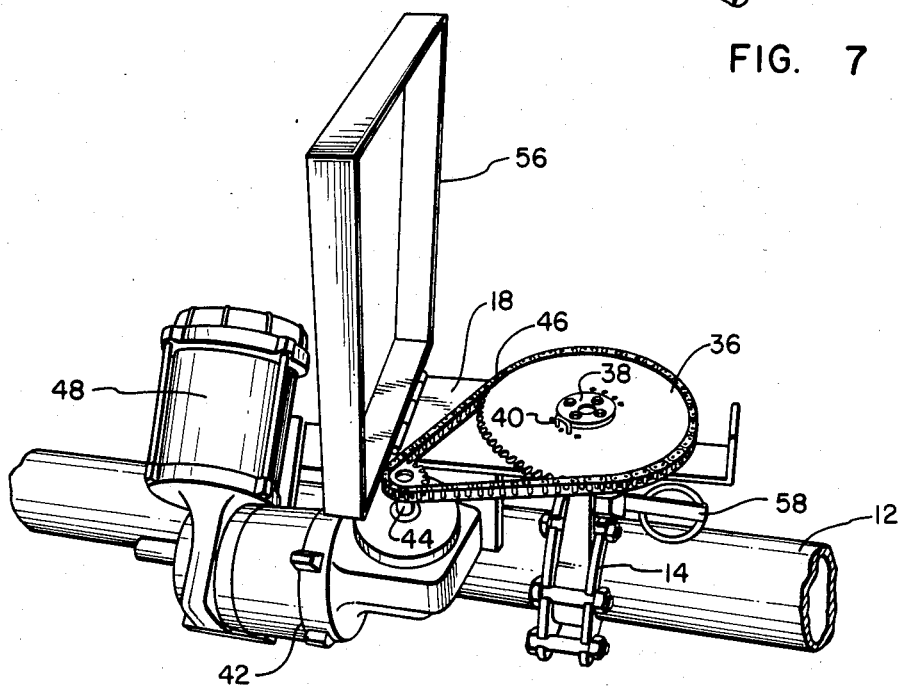
FIG. 8 is an elevational view of the present invention illustrating a gear cover in the open position.
Figure 9:
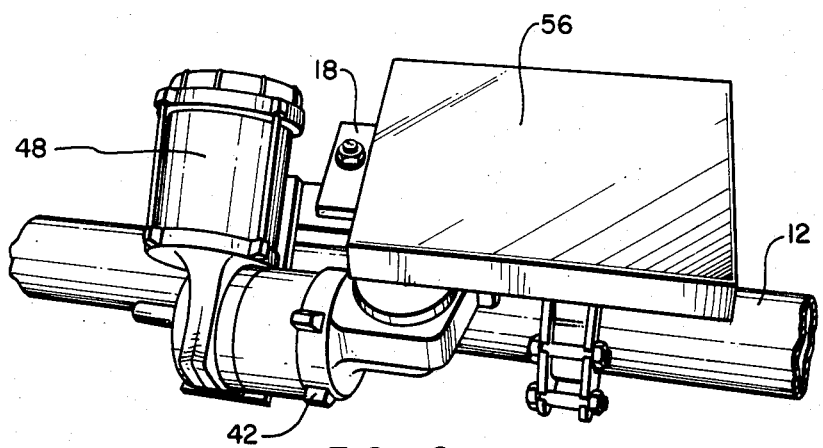
FIG. 9 is an elevational view of the present invention illustrating the gear cover in place over the gear.

An additional possible feature of control mechanism 10 is illustrated in FIGS. 8 and 9. This feature is a cover 56 which is hingably attached to the control mechanism 10 for covering main gear 36 and main drive chain 46. In FIG. 8, cover 56 is shown in the open position so that the various components of the device can be easily viewed. In FIG. 9, the cover is shown in the closed position which will operate to protect the various components of control mechanism 10, particularly drive chain 46, main gear 36, and drive shaft 44 which exits gear box 42.

The current invention also illustrates the use of a manual handle 58. Handle 58 is mounted within the device such that, if necessary, valve 14 could be turned on or off without the assistance of motor 48. This provides further flexibility in the use of the present invention in that the valve 14 may still be operated even if another portion of control mechanism 10 fails.

As a result, it is clear that the current invention solves many of the problems encountered in the prior art. Particularly, the current invention provides a heavy duty mechanism for controlling irrigation valves. The current invention employs a motor which is approximately eight times as powerful as that typically employed in the prior art.

In addition, the current invention includes heavy duty metal gears and drive mechanisms, whereas the prior art typically employed light teflon or nylon components. In addition, the current invention provides a safety mechanism for shutting off the device if undue stress is encountered. The prior art, conversely, provided no such safety mechanism and as a result prior art devices were frequently damaged, necessitating repeated replacement of the entire prior art mechanism on a regular basis. This clearly amounts to a significant expense to the user.

In addition, it will be appreciated that the current invention employs readily available conventional parts. If one of the parts of the current invention should fail, it is a simple matter for the user to replace that particular part. It is not necessary to replace the entire mechanism.

It will be appreciated that the apparatus and methods of the present invention are capable of being incorporated in a variety of embodiments, only a few of which have been illustrated and described above. The invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed and desired to be secured by United States Letters Patent is:

1. An agricultural irrigation valve control apparatus comprising:
    a mounting bracket having means of attachment to an irrigation pipe and an associated irrigation valve mechanism, said mounting bracket being capable of having a motor and a gear box mounted thereon;
    a motor mounted to the mounting bracket;
    a gear box mounted to the mounting bracket;
    means for placing the motor in mechanical communication with the gear box;
    a main gear mounted on the valve mechanism;
    means for placing the main gear in mechanical communication with the gear box;
    control means for controlling the operation of the motor; and
    safety shut-off means such that when the apparatus is subjected to forces, while in operation, which could otherwise damage the apparatus, the motor is caused to shut off wherein said safety shut-off means comprises a shear pin where said shear pin will shear away when the apparatus is subjected to forces which could otherwise damage the apparatus.

2. An irrigation valve control apparatus as defined in claim 1 wherein said means of attaching said mounting bracket to said valve mechanism comprises a plurality of bolts securing said mounting bracket to said valve mechanism.

3. An irrigation valve control apparatus as defined in claim 1 wherein said means of attaching the mounting bracket to the pipe comprises a curved brace secured to the mounting bracket and configured so as to be capable of supporting the mounting bracket on the pipe.

4. An irrigation valve control apparatus as defined in claim 1 wherein said means for placing the motor in mechanical communication with the gear box comprises a drive shaft extending from the motor and being securely attached to the gear box.

5. An irrigation valve control apparatus as defined in claim 1 wherein said means for placing the main gear in mechanical communication with the gear box comprises a main drive chain positioned so as to engage the main gear and the gear box.

6. An irrigation valve control apparatus as defined in claim 1 wherein said means for controlling the operation of the motor comprises an electrical cable, attached to the motor, extending to a source of electrical power and a switch on the cable disposed between the motor and the source of electrical power.

7. An irrigation valve control apparatus as defined in claim 1 wherein the source of electricity and the switch are remote from said control apparatus.

8. An irrigation valve control apparatus as defined in claim 1 wherein the motor has a power rating of approximately one horsepower.

9. An irrigation valve control apparatus as defined in claim 1 wherein the gear box has a gear ratio of at least 30:1.

10. An irrigation valve control apparatus as defined in claim 1 wherein the motor and the gear box are capable of being attached to and detached from the mounting bracket using bolts.

11. An irrigation valve control apparatus comprising:
    a mounting bracket having a curved brace secured to the mounting bracket and configured so as to be capable of supporting the mounting bracket on an irrigation pipe, the mounting bracket being capable of being secured to an irrigation valve mechanism by a plurality of bolts and being capable of receiving for attachment a motor and a gear box;
    an electrical motor mounted to the mounting bracket;
    a gear box mounted to the mounting bracket;
    means for placing the motor in mechanical communication with the gear box comprising a drive shaft extending from the motor and being securely attached to the gear box;
    a main gear mounted on the valve mechanism;
    means for placing the main gear in mechanical communication with the gear box comprising a drive chain;
    means for controlling the operation of the motor comprising an electrical cable attached to the motor and extending to an electrical power source and a switch on the cable disposed between the motor and the electrical power source; and
    safety shut-off means comprising a shear pin such that when the apparatus is subjected to forces, while in operation, which could otherwise damage the apparatus, the shear pin will shear away causing the motor to shut off.

12. An irrigation valve control apparatus as defined in claim 11 wherein the source of electricity and the switch are remote from the control apparatus.

13. An irrigation valve control apparatus as defined in claim 11 wherein the motor has a power rating of approximately one horsepower.

14. An irrigation valve control apparatus as defined in claim 11 wherein said gear box has a gear ratio of at least 30:1.

15. An irrigation valve control apparatus as defined in claim 11 wherein said motor and said gear box are capable of being attached to and detached from said mounting bracket using bolts.

16. An irrigation valve control apparatus comprising:
 a mounting bracket having a curved brace secured to the mounting bracket and configured so as to be capable of supporting the mounting bracket on an irrigation pipe, the mounting bracket being capable of being secured to an irrigation valve mechanism by a plurality of bolts and being capable of receiving for attachment a motor and a gear box;
 an electrical motor having a power rating of approximately one horsepower mounted to the mounting bracket;
 a gear box having a gear ratio of at least 30:1 and a drive shaft extending generally vertically from the gear box, the gear box being mounted to the mounting bracket;
 means for placing the motor in mechanical communication with the gear box comprising a drive shaft extending generally horizontally from the motor and being securely attached to the gear box;
 a main gear mounted on the valve mechanism;
 means for placing the main gear in mechanical communication with the gear box comprising a drive chain secured to the main gear and to the drive shaft extending generally vertically from the gear box;
 means for controlling the operation of the motor comprising an electrical cable attached to the motor and extending to an electrical power source remote from the apparatus and a switch on the cable disposed between the motor and the electrical power source; and
 safety shut-off means comprising a shear pin such that when the apparatus is subjected to forces, while in operation, which could otherwise damage the apparatus, the shear pin will shear away causing the motor to shut off.

* * * * *

UNITED STATES PATENT AND TRADEMARK OFFICE
CERTIFICATE OF CORRECTION

PATENT NO. : 4,611,617
DATED : September 16, 1986
INVENTOR(S) : Ronnie D. Hewitt It is certified that error appears in the above-identified patent and that said Letters Patent are hereby corrected as shown below:

Column 1, line 27, "Rain fall" should be --Rainfall--
Column 2, lines 52-53, "mentioned above" should be --as mentioned above--
Column 5, lines 18-19, "manner, however," should be --manner; however,"
Column 5, line 19, "device" should be --device,--
Column 5, line 50, "preferrably" should be --preferably--

Signed and Sealed this

Twenty-fifth Day of November, 1986

Attest:

DONALD J. QUIGG

Attesting Officer

Commissioner of Patents and Trademarks